L. E. WATERMAN.
TRACTION PLOW CONTROLLING MECHANISM.
APPLICATION FILED AUG. 24, 1914.
1,198,299.
Patented Sept. 12, 1916.
2 SHEETS—SHEET 1.
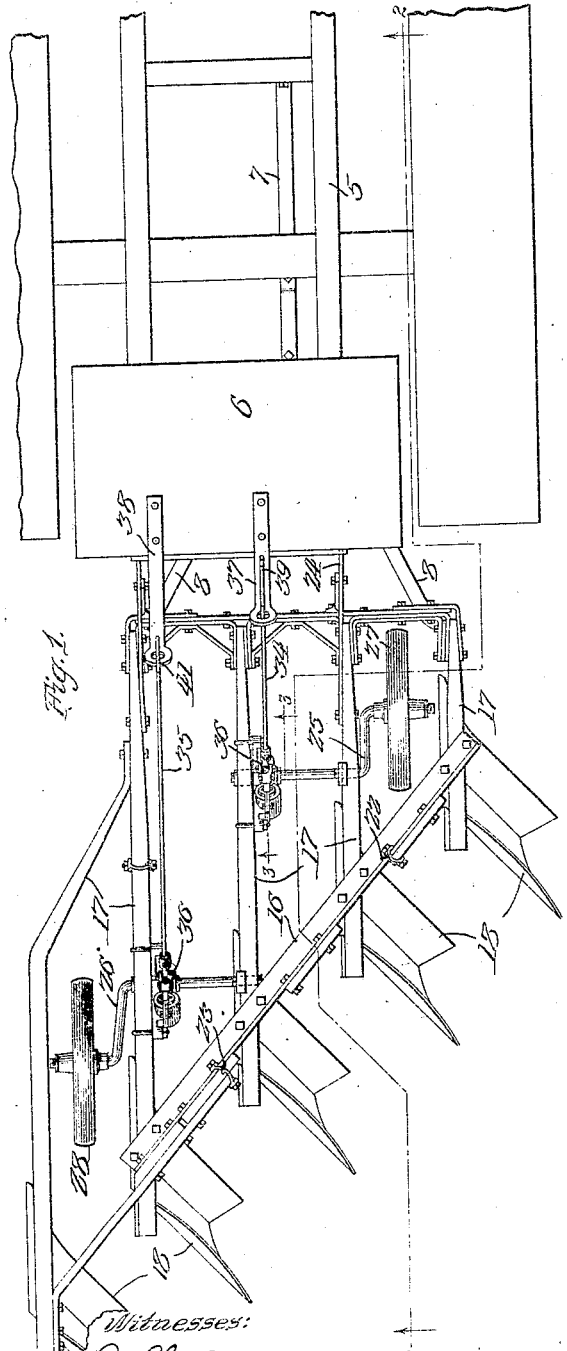
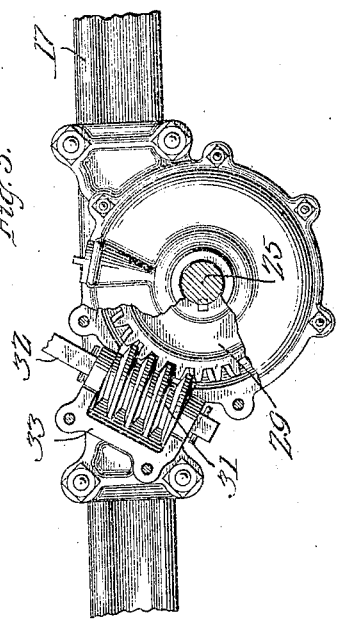
Witnesses:
Inventor:
Lewis E. Waterman
By Pond & Wilson
Attys

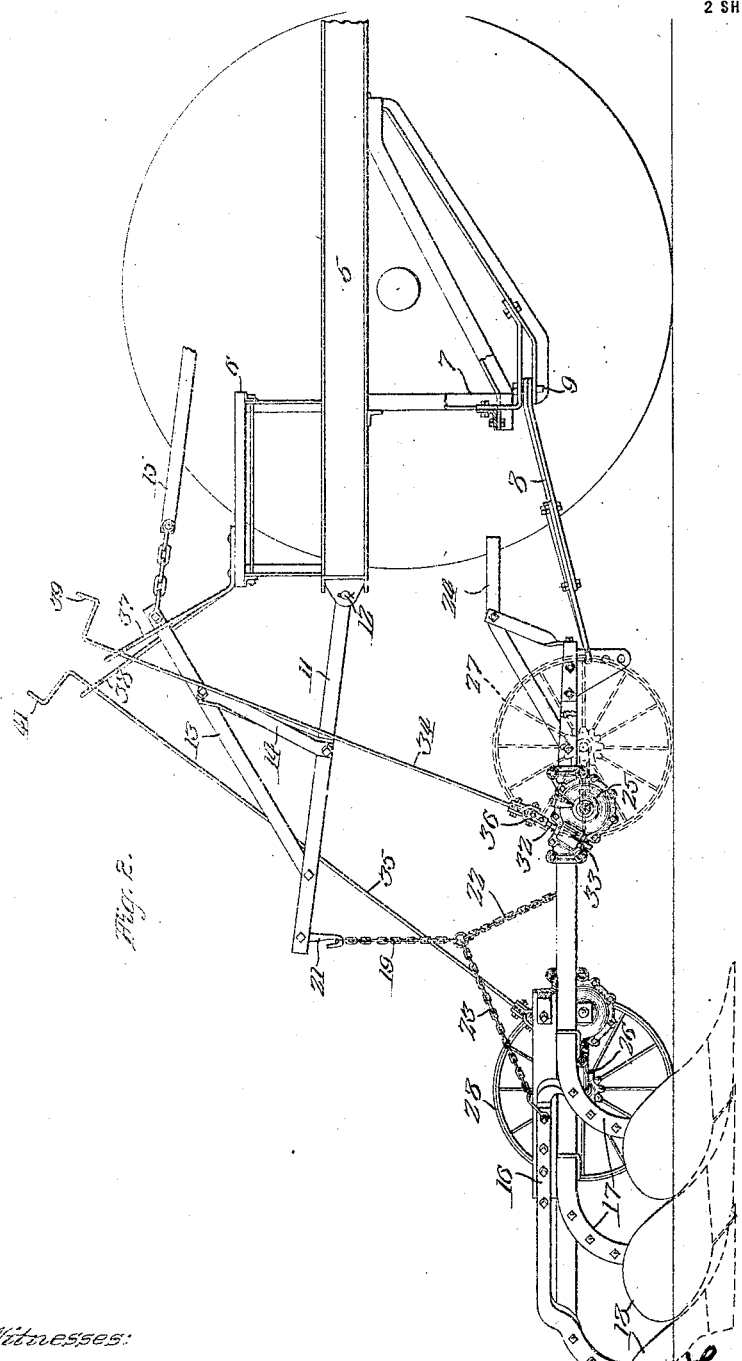

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

TRACTION-PLOW-CONTROLLING MECHANISM.

1,198,299.   Specification of Letters Patent.   Patented Sept. 12, 1916.

Application filed August 24, 1914. Serial No. 858,337.

*To all whom it may concern:*

Be it known that I, LEWIS E. WATERMAN, a citizen of the United States, residing at Rockford, in the county of Winnebago and State of Illinois, have invented certain new and useful Improvements in Traction-Plow-Controlling Mechanism, of which the following is a specification.

This invention relates in general to mechanism for controlling the depth to which plows will operate in the soil, and more particularly refers to mechanism for controlling the depth of operation of a tractor gang plow.

One of the primary objects of the present invention is to provide mechanism which is accessible to and capable of being operated by the driver of the tractor, so that the driver can regulate the depth of the plows to a fine degree of nicety without leaving his seat on the tractor.

Another object of the invention is to provide mechanism for regulating the depth of the plows, which will be easy to manipulate, and which will automatically remain in any position to which it may be adjusted without the employment of auxiliary sustaining or locking mechanism.

Various other objects and advantages of the invention will be apparent as the same becomes better understood by reference to the following description when considered in connection with the accompanying drawings.

Referring to the drawings: Figure 1 is a fragmentary plan view of a plow equipped with my invention; Fig. 2 is a sectional view on the line 2—2 of Fig. 1, and Fig. 3 is a sectional view on the line 3—3 of Fig. 1.

On the drawings reference character 5 indicates the main frame of a tractor of any well-known or preferred construction. The frame is provided with a seat 6 for the tractor driver and with a downwardly extending reinforced draft frame 7 to which the forward end of the draft member 8 is connected by a coupling pin 9 or other suitable means.

A lifting and lowering arm 11 is pivoted to the rear end of the tractor frame on a pin 12 and has connected thereto an upwardly extending arm 13 held in fixed relation with the arm 11 by braces 14, the upper end of arm 13 being connected by a link 15 with lifting and lowering mechanism (not shown) carried and operated by the tractor.

The plow frame designated generally by reference character 16 has rigidly connected thereto a series of plow beams 17 each carrying at its rear end a plow 18. The plows are adapted to be lifted and lowered by the arm 11 through the intermediary of a chain 19 attached at its upper end to a hook 21 and connected at its lower end by chains 22 and 23 with the plow frame. The chain 22, as will be obvious from Fig. 2, is shorter than the chain 23 and is connected with the frame in front of the transverse axis thereof so that initial movement of the arm 11 will exert a practically direct upward pull upon the forward portion of the plow frame so that the points of the plows will be tilted upwardly thereby enabling the plows to be easily drawn out of the soil. As the plows leave the soil the forward end of the plow frame will be lifted in advance of the rear end until a pair of brackets 24 extending upwardly and forwardly from the front end of the plow frame are brought into engagement with the rear end of the tractor frame to thereby arrest further upward movement of the front end of the plow frame. Continued upward movement of the lifting arm 11 will thereafter cause the rear end of the plow frame to be tilted upwardly about the point of engagement between the bracket 24 and the tractor frame 5 as a pivot until the plows are elevated to the desired height above the ground. When the plows are carried in elevated position they will be prevented from swinging and rocking by the brackets which engage the tractor frame at a plurality of spaced points.

Prior to my invention, it has been the practice, as far as I am aware, in tractor plows of this character to regulate the depth at which the plows will operate, by means operable from the gang plow only. I have found, however, that with such means, depth adjustment of the plows can not be secured by the tractor driver while the tractor is in motion, and I have therefore embodied in my present invention an adjusting mechanism adapted to be controlled by the driver from his seat on the tractor. With this in view I have mounted upon the plow frame a plurality of crank shaft axles 25 and 26 upon which supporting wheels 27 and 28 respectively are mounted. By turning the axles in their bearings on the frame to raise or lower the wheels 27 and 28 with respect to the frame, the depth at which the plows will operate can be regulated to a fine degree of nicety and by this same mechanism the bottoms of the plows may also be leveled. Upon each of the shafts 25 and 26 I have, therefore, mounted a worm-wheel 29 adapted to mesh with and be operated by a worm 31 fixed on a short shaft 32 which is mounted in a suitable bracket 33 secured upon one of the beams 17. Since the worm-wheels and operating worms for both of the shafts 25 and 26 are substantially identical, a detail description of one which is clearly illustrated in Fig. 3 will suffice for an understanding of both. The worms for adjusting shafts 25 and 26 are manipulated by rods 34 and 35 respectively, connected by means of universal connections 36 with their respective worm-shafts. The operating rods or shafts 34 and 35 extend upwardly through brackets 37 and 38 on the tractor frame adjacent to the driver's seat and are shaped at their upper ends to provide cranks 39 and 41 by means of which the rods may be operated to rotate the axles and thereby adjust the position of the wheels. When the plow frame is raised and lowered bodily by the lifting arm 11, the rods 34 and 35 will slide longitudinally through the eyes in the bracket arms 37 and 38 so as not to interfere with the raising and lowering movements of the plow.

By operating crank 39 the driver may raise or lower the wheel 27 and similarly by operating the crank 41, he may raise or lower the wheel 28. The position of these wheels with respect to the plow frame will obviously determine the depth at which the plows will operate. By raising or lowering one of the wheels with respect to the other, the bottoms of the plows may be leveled so as to cut in the desired horizontal plane. After the plows have been adjusted by the mechanism described, they will be maintained in their adjusted position by frictional engagement between the worms and their respective worm wheels without the employment of any additional or auxiliary locking means.

My invention and its mode of operation should be clearly understood from the foregoing without further description, and it will be obvious that various changes and modifications in the details of the construction illustrated and described may be resorted to without departing from the scope of the invention as set forth in the following claims.

I claim:

1. In a tractor-propelled implement adapted to be lifted bodily from the ground by a tractor, the combination of a frame, earth-working tools rigidly carried by the frame, supporting wheels adjustably mounted on the frame at each side thereof to regulate the working depth of said tools and level said tools, means including a worm and gear for adjusting the supporting wheels and maintaining them in adjusted position, means extending from the frame into position to be operated from the tractor for actuating said worm and gear, and means carried by the tractor for lifting said frame, wheels and adjusting means bodily and supporting the same solely from the tractor.

2. The combination of a tractor, an implement frame having its forward end pivotally attached to and supported by said tractor, an earth-working implement carried by said frame, means disposed in position to be operated from the tractor for leveling the implement and regulating the working depth of said implement, and means carried by the tractor for raising said frame and said regulating means bodily and supporting the same from the tractor with the implement clear of the ground.

3. In a tractor-propelled implement adapted to be lifted bodily from the ground by the tractor, the combination of a frame, earth-working tools carried thereby, a crank-axle mounted on the frame adjacent each side thereof, a supporting-wheel mounted on each crank-axle, a worm and gear connected with each crank-axle for adjusting the same to regulate the working depth of the tools, a shaft connected with each worm, extending in proximity to the tractor frame and provided with a hand-crank, and means for guiding the crank ends of the shafts so as to permit the shafts to move with the frame as the same is raised and lowered.

4. In a tractor-propelled implement adapted to be lifted bodily from the ground by the tractor, the combination of a frame, earth-working tools carried thereby, a crank-axle mounted on the frame adjacent each side thereof, supporting-wheels mounted on each crank-axle, a worm and gear connected with each crank-axle for adjusting the same to regulate the working depth of the tools, a shaft flexibly connected with each worm, extending in proximity to the tractor frame and provided with a hand-crank, and means for guiding the crank-ends of the shafts so as to permit movement of the shafts with the frame as the same is raised and lowered.

LEWIS E. WATERMAN.

Witnesses:
G. R. MILLER,
L. A. GIFFEN.